(12) United States Patent
Frankl et al.

(10) Patent No.: US 7,784,597 B2
(45) Date of Patent: *Aug. 31, 2010

(54) TELESCOPING CONVEYOR DRIVE SYSTEM (75) Inventors: Jim Frankl, Elk Point, SD (US); Clay Crandall, Sioux City, IA (US)

(73) Assignee: Masaba, Inc., Vermillion, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/291,469

(22) Filed: Nov. 10, 2008

(65) Prior Publication Data

US 2009/0071797 A1 Mar. 19, 2009

Related U.S. Application Data (63) Continuation of application No. 11/891,480, filed on Aug. 10, 2007, now Pat. No. 7,448,486.

(51) Int. Cl.
  *B65G 15/26* (2006.01)
(52) U.S. Cl. ........................... 198/313; 198/812
(58) Field of Classification Search ............ 198/312, 198/313, 588, 594, 812, 861.1
  See application file for complete search history.

(56) References Cited

U.S. PATENT DOCUMENTS

| 3,341,029 | A | 9/1967 | Barkley et al. |
| 3,613,866 | A | 10/1971 | Arndt et al. |
| 3,874,136 | A | 4/1975 | Michel |
| 3,993,204 | A | 11/1976 | Hummel |
| 4,135,614 | A | 1/1979 | Penterman et al. |
| 4,245,732 | A | 1/1981 | Couperus |
| 4,474,287 | A | 10/1984 | Thompson |
| 4,679,652 | A | 7/1987 | Cervantes, Sr. |
| 4,780,041 | A | 10/1988 | Ashby |
| 4,813,526 | A | 3/1989 | Belanger |
| 5,009,560 | A | 4/1991 | Ruder et al. |
| 5,067,867 | A | 11/1991 | Ruder et al. |
| 5,074,402 | A | 12/1991 | Bender-Zanoni et al. |
| 5,088,873 | A | 2/1992 | Ruder et al. |
| 5,203,442 | A | 4/1993 | Oury et al. |

(Continued)

OTHER PUBLICATIONS

Thor Global Enterprises, Ltd., "ThorStack2" brochure, 4 pages.

*Primary Examiner*—James R Bidwell
(74) *Attorney, Agent, or Firm*—Jeffrey A. Proehl; Woods, Fuller, Schultz & Smith, P.C.

(57) ABSTRACT

An extendable conveyor apparatus is disclosed and comprises a stationary conveyor section, a movable conveyor section extendable with respect to the stationary conveyor section, and a movement assembly configured to move the movable conveyor section with respect to the stationary conveyor section. The movement assembly comprises a plurality of teeth mounted on a first conveyor section, and a teeth engaging apparatus mounted on a second conveyor section and configured to engage and move the teeth on the first conveyor section with respect to the second conveyor section. A system for moving a first elongate structure with respect a second elongate structure comprises a plurality of teeth in a substantially linear arrangement for mounting on the first elongate structure, and a teeth engaging apparatus configured for mounting on the second elongate structure, the teeth engaging structure comprising a chain loop engaging the teeth such that rotation of the loop moves the first elongate structure relative to the second elongate structure.

19 Claims, 8 Drawing Sheets

U.S. PATENT DOCUMENTS

| | | | |
|---|---|---|---|
| 5,256,021 A | 10/1993 | Wolf et al. | |
| 5,351,809 A | 10/1994 | Gilmore et al. | |
| 5,423,413 A | 6/1995 | Gilmore | |
| 5,515,961 A | 5/1996 | Murphy et al. | |
| 5,718,325 A | 2/1998 | Doster et al. | |
| 5,833,043 A | 11/1998 | Schmidgall et al. | |
| 5,902,089 A | 5/1999 | Sinn et al. | |
| 6,006,893 A | 12/1999 | Gilmore et al. | |
| 6,056,252 A | 5/2000 | Johannsen | |
| 6,298,981 B1 | 10/2001 | Hosch et al. | |
| 6,360,876 B1 | 3/2002 | Nohl et al. | |
| 6,752,261 B1 * | 6/2004 | Gaeddert et al. | 198/861.1 |
| 6,929,113 B1 | 8/2005 | Hoover et al. | |
| 6,935,487 B2 | 8/2005 | Schaum et al. | |
| 7,108,125 B2 | 9/2006 | Gilmore et al. | |
| 7,168,555 B2 | 1/2007 | Peterson | |
| 7,322,462 B2 | 1/2008 | Landry | |
| 7,448,486 B1 * | 11/2008 | Frankl et al. | 198/313 |
| 2003/0029694 A1 | 2/2003 | Gilmore | |

* cited by examiner

TELESCOPING CONVEYOR DRIVE SYSTEM

REFERENCE TO RELATED APPLICATION

This application is a continuation-in-part of my patent application Ser. No. 11/891,480, filed Aug. 10, 2007 and issued on Nov. 11, 2008 as U.S. Pat. No. 7,448,486.

BACKGROUND

1. Field

The present disclosure relates to extendable conveyor systems, and more particularly pertains to a new telescoping conveyor drive system for extending and retracting the movable portion of an extendable conveyor system with respect to the stationary portion of the conveyor system.

2. Description of the Prior Art

Extendable conveyor systems have been employed to, for example, place granular or crushed materials in distributed locations to maximize the amount of material in a stockpile as well as minimize material segregation. The extendable conveyor systems typically include a section of the conveyor belt and supporting structure that is relatively stationary, and a section of the conveyor belt and supporting structure that is movable with respect to the stationary portion.

Various systems have been employed to move the movable portion of the conveyor with respect to the stationary portion of the conveyor. A common approach involves the use of a system of cables that pull the movable portion of the conveyor outwardly from the stationary portion of the conveyor. The cable or cables may be positioned on a system of pulleys that guide the cable with respect to the portions of the conveyor system. A significant drawback of the cable system is that the cable is subject to wear, and can break and fail, which releases the movable portion of the conveyor and can allow the movable portion to freely fall and retract into the stationary portion unless some emergency braking system is employed. Further, the cables stretch over time and as a result have significant maintenance requirements.

It is therefore believed that due to the limitations of the systems employing cables for extending the movable portion of the extendable conveyor, there is a need for an improved drive system for extending and retracting the movable portion of the conveyor systems that is not subject to the same chance for failure as the cable-based system, and if a failure does occur, impedes or prevents unintended free movement of the movable portion.

SUMMARY

In view of the foregoing disadvantages inherent in the known types of drive systems for extendable conveyors now present in the prior art, the present disclosure describes a new telescoping conveyor drive system which may be utilized for providing a highly reliable and safe drive system for extending and retracting the movable section of the conveyor.

In one aspect, the present disclosure relates to an extendable conveyor apparatus comprising a stationary conveyor section, a movable conveyor section extendable with respect to the stationary conveyor section, and a movement assembly configured to move the movable conveyor section with respect to the stationary conveyor section. The movement assembly may comprise a plurality of teeth mounted on a first one of the conveyor sections, and a teeth engaging apparatus mounted on a second one of the conveyor sections and configured to engage and move the plurality of teeth on the first conveyor section with respect to the second conveyor section.

In another aspect, a system for moving a first elongate structure with respect a second elongate structure is disclosed. The system may comprise a plurality of teeth positioned in a substantially linear arrangement and configured for mounting on the first elongate structure, and a teeth engaging apparatus configured for mounting on the second elongate structure. The teeth engaging structure may comprise a chain loop having a stretch of chain links engaging a portion of the plurality of teeth such that rotation of the chain loop causes movement of the first elongate structure with respect to the second elongate structure.

There has thus been outlined, rather broadly, some of the more important elements of the invention in order that the detailed description thereof that follows may be better understood, and in order that the present contribution to the art may be better appreciated. There are additional elements of the invention that will be described hereinafter and which will form the subject matter of the claims appended hereto.

In this respect, before explaining at least one embodiment or implementation in greater detail, it is to be understood that the scope of the invention is not limited in its application to the details of construction and to the arrangements of the components set forth in the following description or illustrated in the drawings. The invention is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present invention.

The advantages of the various embodiments of the present invention, along with the various features of novelty that characterize the invention, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
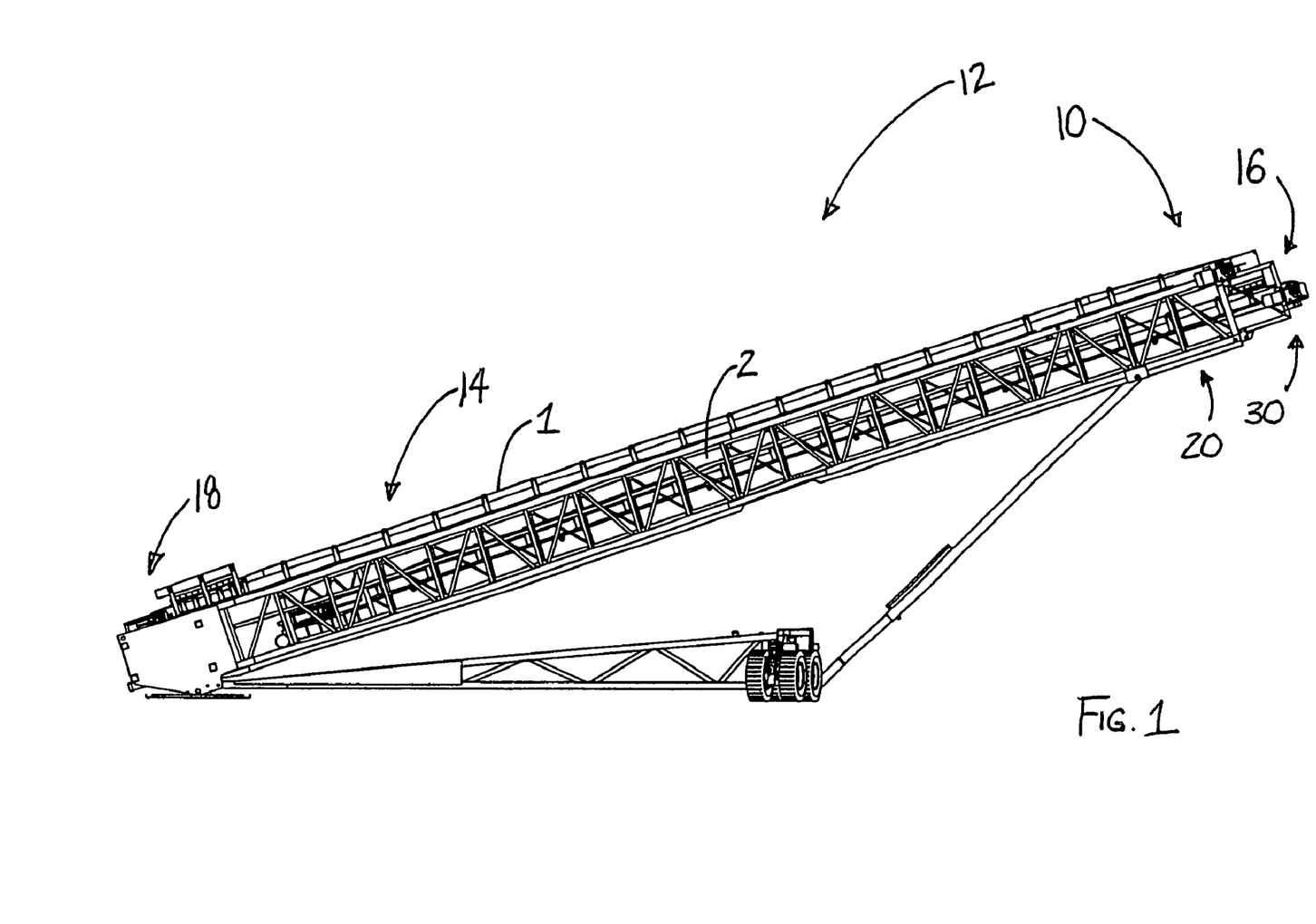
FIG. 1 is a schematic side view of an extendable conveyor apparatus with the new telescoping conveyor drive system according to the present disclosure, with the movable conveyor section shown in the retracted position.
Figure 2:
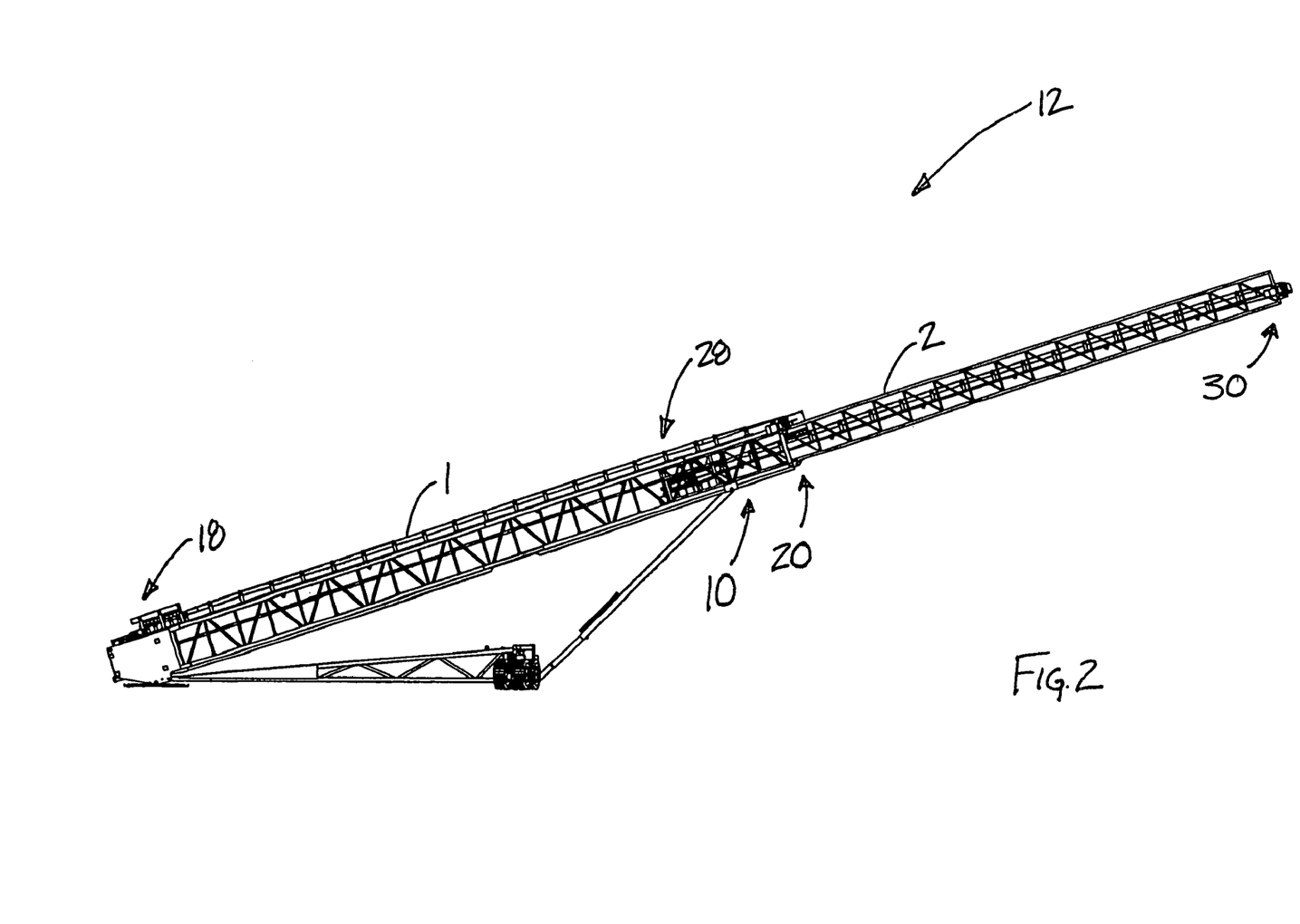
FIG. 2 is a schematic side view of the extendable conveyor apparatus with the telescoping conveyor drive system, with the movable conveyor section shown in the extended position.
Figure 3:
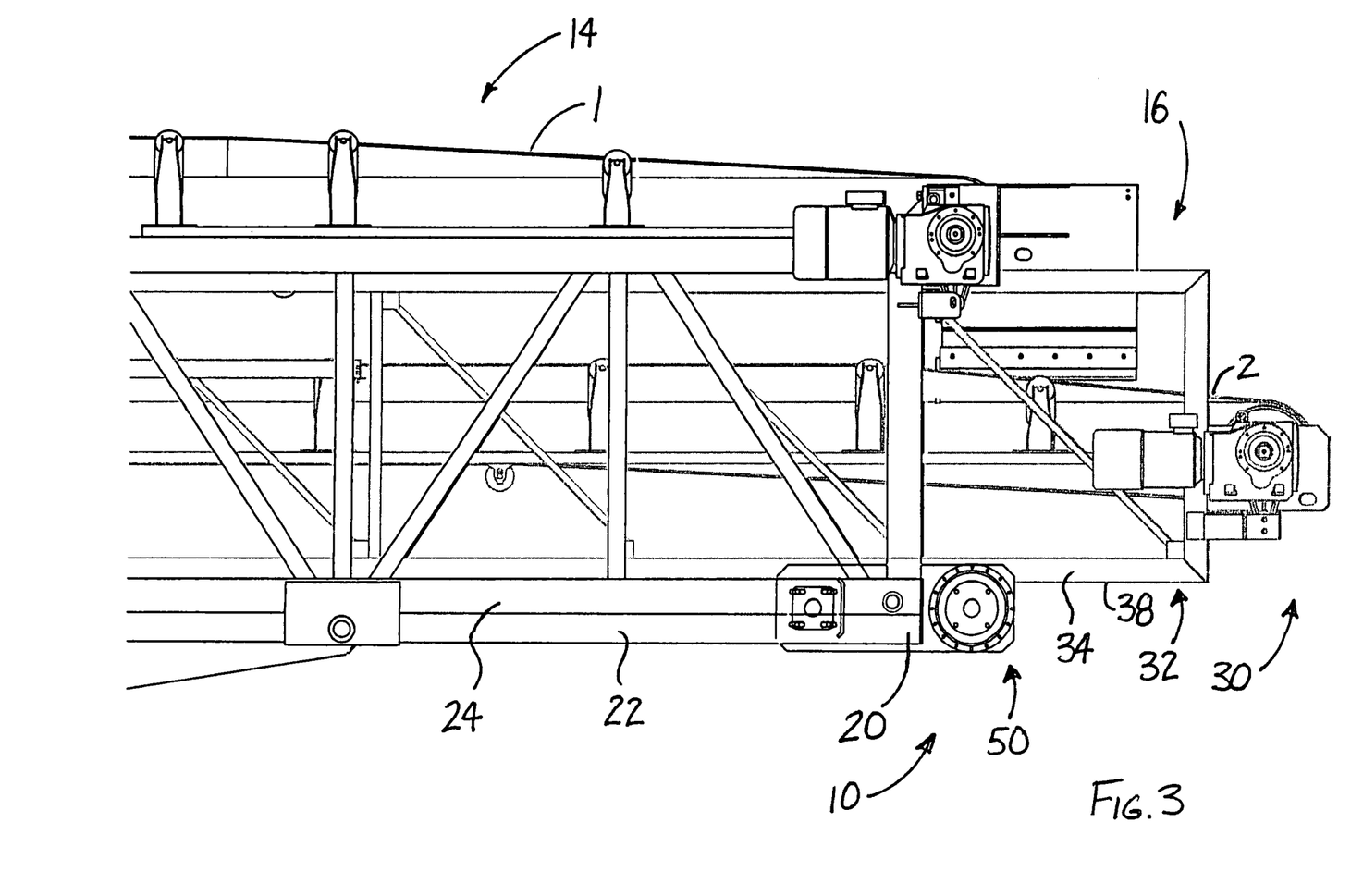
FIG. 3 is a schematic side view of the outboard end portion of the stationary conveyor section and the second end of the movable conveyor section with the movable conveyor section in a retracted position.
Figure 4:
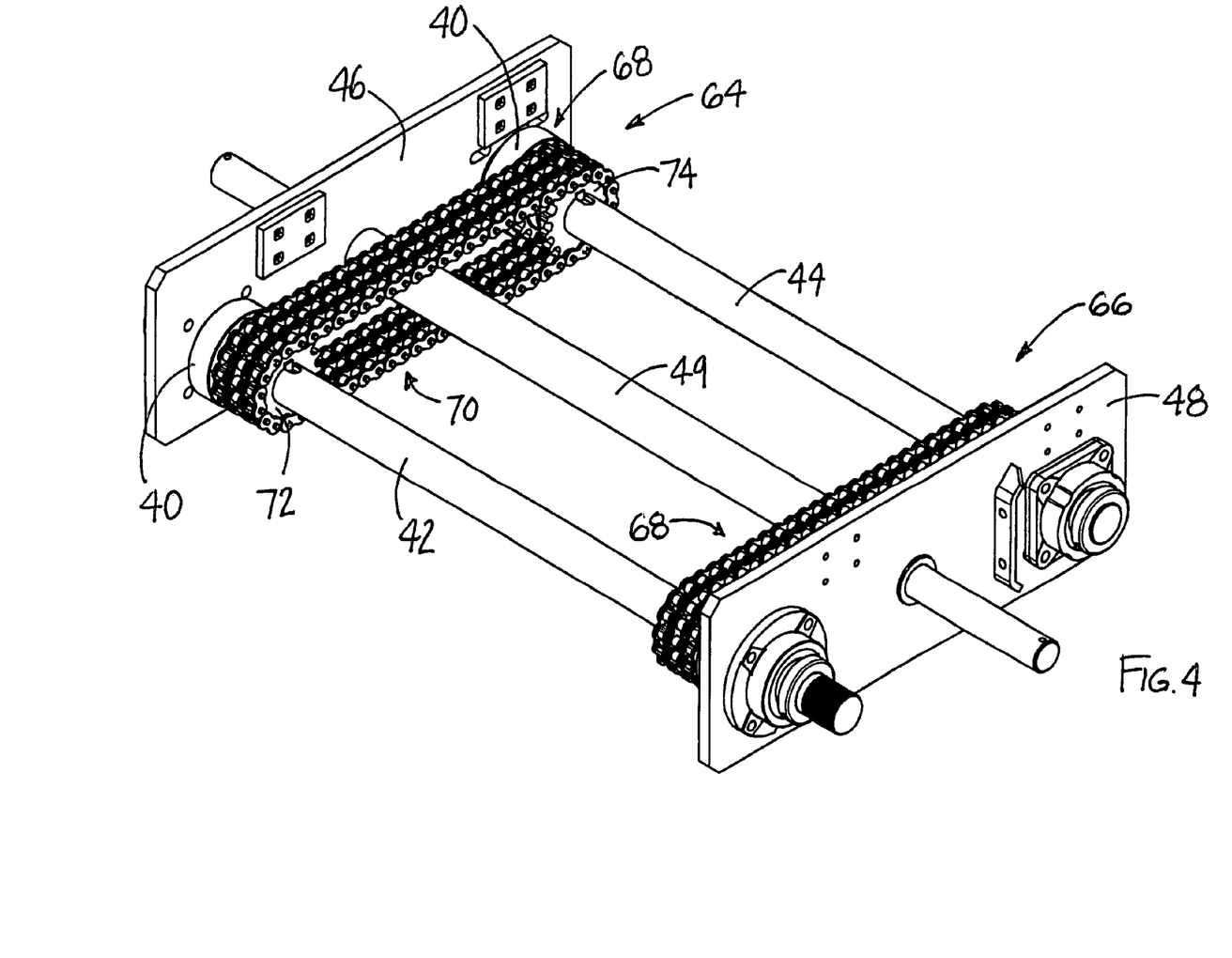
FIG. 4 is a schematic perspective view of a portion of the conveyor drive system isolated from the extendable conveyor apparatus, according to an illustrative embodiment.
Figure 5:
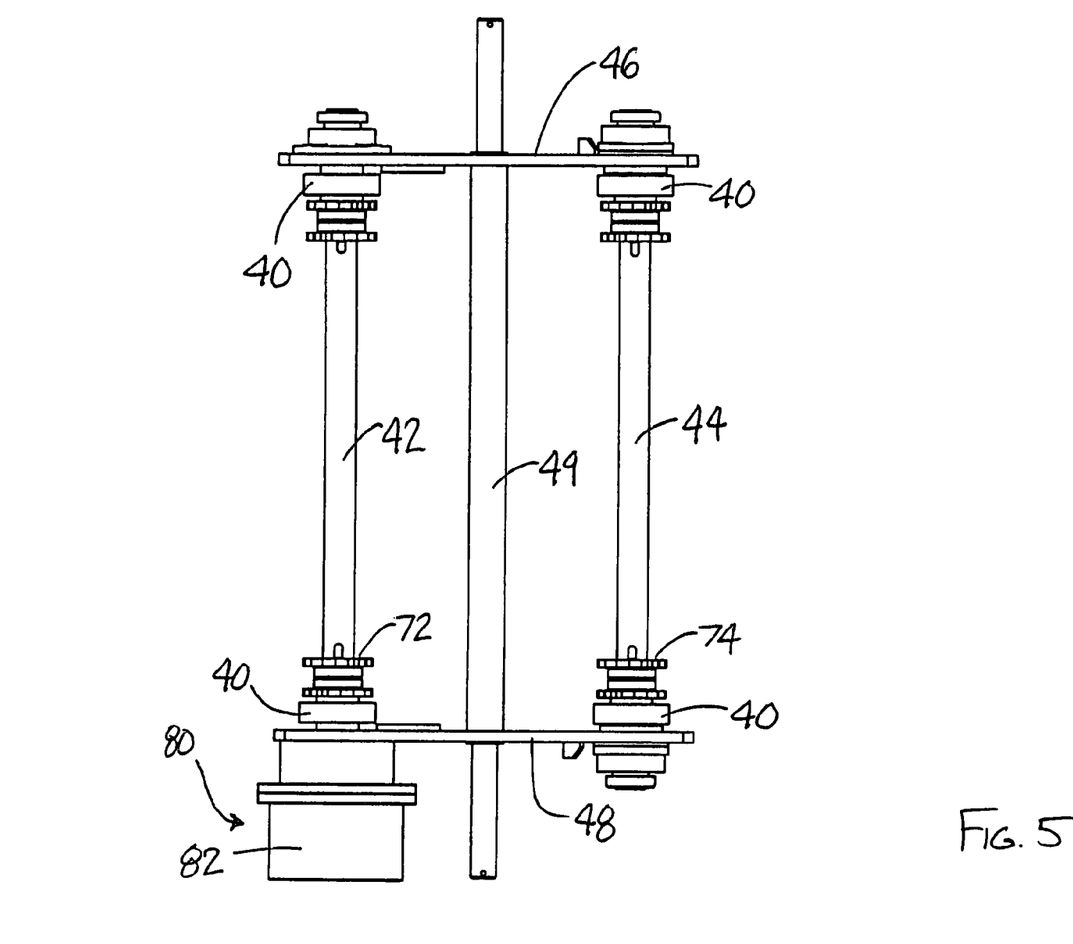
FIG. 5 is a schematic top view of a portion of the conveyor drive system with the chain loops removed to reveal detail of the drive system.
Figure 6:
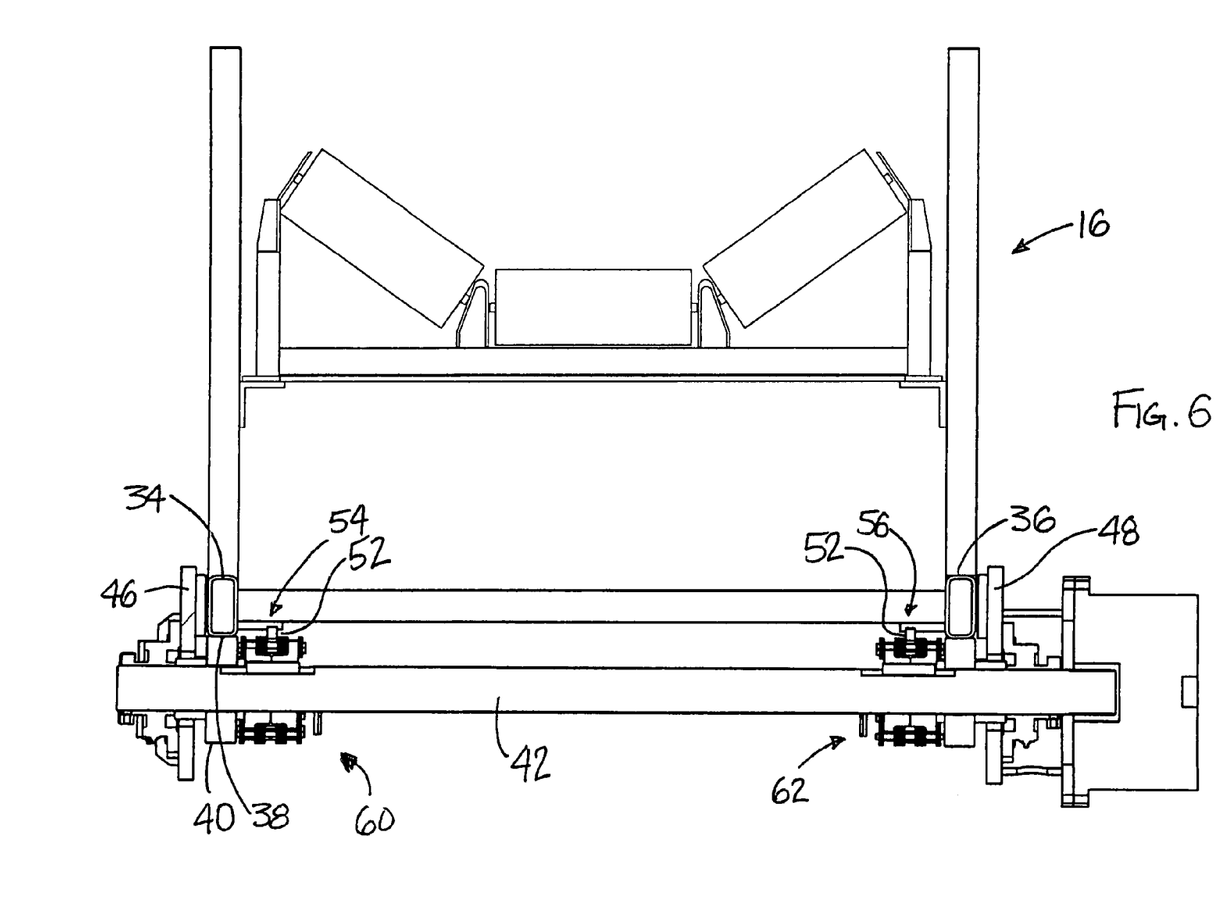
FIG. 6 is a schematic end view of the movable conveyor section shown in relationship to the conveyor drive system.
Figure 7:
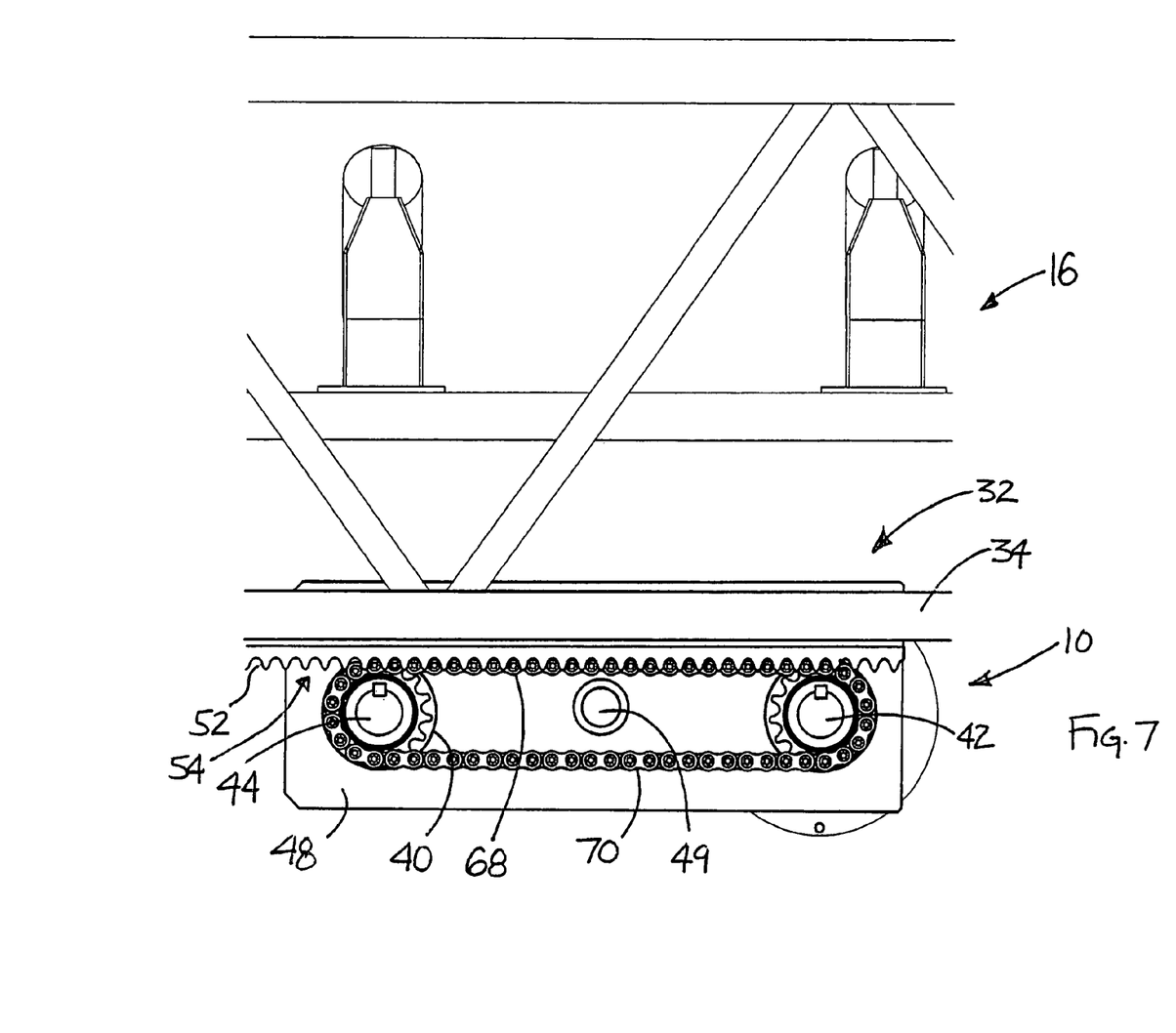
FIG. 7 is a schematic side view of the movable conveyor section shown in relationship to the conveyor drive system.
Figure 8:
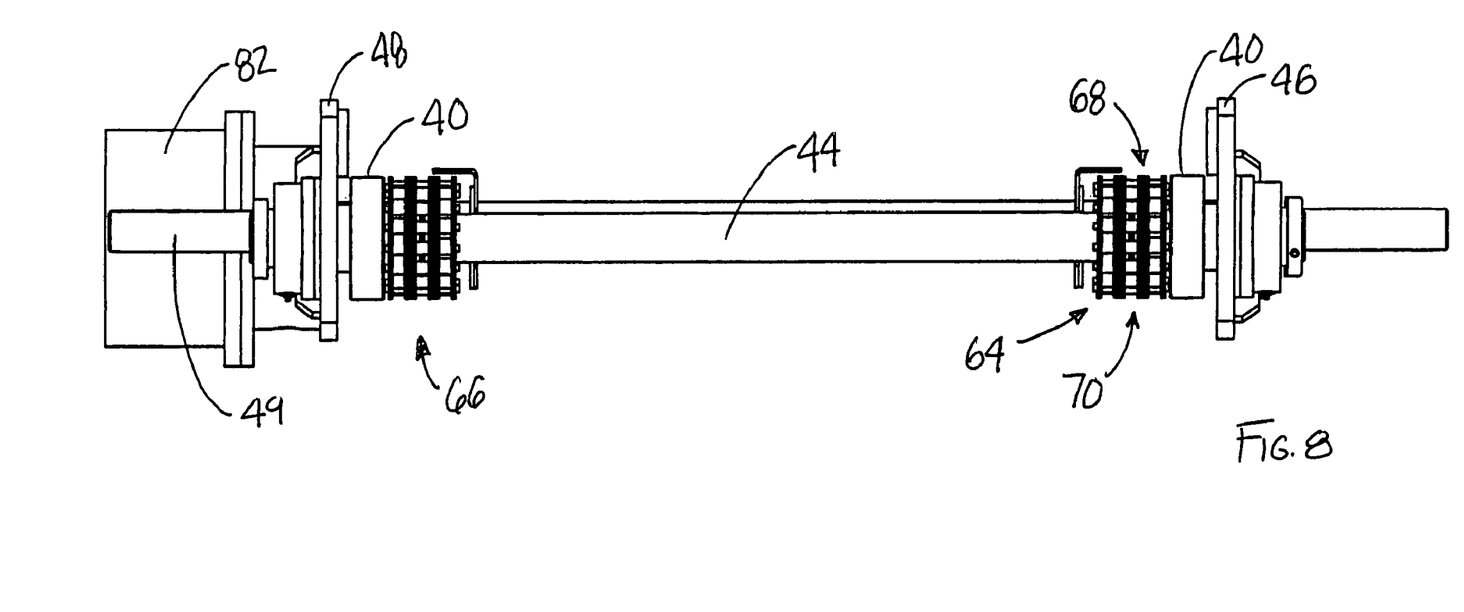
FIG. 8 is a schematic end view of the conveyor drive system shown isolated from the conveyor sections.

With reference now to the drawings, and in particular to FIGS. 1 through 8 thereof, a new telescoping conveyor drive system embodying the principles and concepts of the disclosed subject matter will be described.

As best illustrated in FIGS. 1 through 8, the telescoping conveyor drive system 10 may be highly suitably employed on an extendable conveyor apparatus 12, although the system 10 is not necessarily so limited, and those skilled in the art will recognize that the system 10 may be employed, for example, on other apparatus with elements that extend and retract with respect to each other, whether in a telescopic relationship or otherwise. Illustratively, the system 10 could be employed on an extendable crane or lift.

For the present disclosure, the system 10 will be described in the context of an extendable conveyor apparatus 12 which may include a stationary conveyor section 14 and a movable conveyor section 16. The movable conveyor section 16 may be extendable and retractable with respect to the stationary conveyor section 14. The conveyor apparatus 12 is typically portable between locations, and the use of the terminology "stationary" conveyor section is not intended to indicate that this section of the conveyor cannot be moved from location to location, or in a lateral sweep, but to simply indicate that the conveyor section 14 remains generally stationary relative to the ground and the conveyor section 16 moves relative to the conveyor section 14 when the conveyor 12 is extended or retracted.

Illustratively, the movable conveyor section 16 is telescopically received or nested in the stationary conveyor section 14, although the system 10 is not necessarily limited to such an arrangement. In various embodiments, one or both of the conveyor sections 14, 16 are formed of a box truss or space frame that accommodates a nested relationship between the sections 14, 16. Optionally, the conveyor sections may be formed of a more solid or continuous structure than a truss.

The stationary conveyor section 14 may include an inboard end 18 and an outboard end 20. The stationary conveyor section 14 may comprise a lower support extent 22, and the conveyor belt 1 may be positioned at an upper extent of the conveyor section 14. The lower support extent 22 may include a pair of lower support members 24, which may comprise elements of the truss structure. The lower support members 24 may extend along at least a portion of a length of the stationary conveyor section 14. The lower support members 24 may be laterally spaced from each other to the sides of the stationary conveyor section 14.

The movable conveyor section 16 may be movably nested in the stationary conveyor section 14. The movable conveyor section 16 may have a first end 28 that is nested in the stationary conveyor section 12 and a second end 30 that is movable outwardly from the stationary conveyor section 14 but may be retractable into the stationary conveyor section. The movable conveyor section 16 may have a length defined between the first 28 and second 30 ends. The movable conveyor section 16 may include a lower extent 32, and the lower extent may include a pair of lower members 34, 36, which may be elements of a truss structure forming the section 16. The lower members 34, 36 may extend along at least a portion of the length of the movable conveyor section 16. The lower members 34, 36 may each have a lower surface 38.

Each of the conveyor sections 14, 16 may include a conveyor belt 1, 2 mounted in a conventional manner on each of the respective sections 14, 16 so that material placed upon a conveyor belt 1 of the stationary conveyor section 14 moves with the belt 1, for example, from the inboard end 18 of the stationary conveyor section 14 to the outboard end 20, and the material falls from conveyor belt at the outboard end onto a conveyor belt 2 mounted on the movable conveyor section 16. The material falls onto the belt 2 of the movable conveyor section 16 toward the first end 28 thereof, and then moves along the length of the conveyor section 16 and off of the second end 30 of the section 16 to the ground.

In some embodiments, at least one support roller 40 and preferably a plurality of the support rollers, are mounted on the stationary conveyor section 14 in a manner that permits rotation of the support rollers. The support rollers 40 may be mounted toward the outboard end 30 of the stationary conveyor section 14. The support rollers 40 may be positioned so that the movable conveyor section 16 rests on and is supported by the support rollers 40, and the movable conveyor section rolls on the support rollers 40 when the movable conveyor section 16 is extended or retracted with respect to the stationary conveyor section 14. In some embodiments, the rollers 40 are mounted on a first support axle 42 and a second support axle 44 which are spaced from each other in the longitudinal direction of the stationary conveyor section 14. The rollers 40 may be laterally spaced from each other on each of the axles 42, 44, and illustratively a pair of the rollers 40 are mounted on each of the axles 42, 44, although each of the axles could include more or fewer rollers. In some embodiments, the axles 42, 44 are mounted a pair of laterally spaced support elements 46, 48 with the axles extending between the support elements 46, 48, and the rollers 40 may be positioned between the support elements 46, 48. Suitable bearings or bushings may be employed to mount the axles 42, 44 on the support elements 46, 48. In various embodiments, the support elements 46, 48 may be mounted on a pivot shaft 49 that is in turn mounted or supported on the stationary conveyor section 14. For example, end portions of the pivot shaft 49 may be mounted or connected to the lower support members 24 of the lower support extent 22 of the stationary conveyor section 14. The pivot shaft 49 permits the support elements 46, 48, as well as the axles 42, 44 mounted thereon, to move with respect to the stationary conveyor section 14 to facilitate contact between the rollers 40 and the movable conveyor section 16. The configuration of the pivot shaft 49 and the support elements 46, 48 is sometimes referred to as a walking beam arrangement.

The telescoping conveyor drive system 10 may include a movement assembly 50 that is configured to move the movable conveyor section 16 with respect to the stationary conveyor section 14 in a generally longitudinal direction of the conveyor sections 14, 16. The movement assembly 50 may include a plurality of teeth 52 mounted on the movable conveyor section 16. The plurality of teeth may include at least one array 54 of teeth 50 being arranged in a linear arrangement along a portion of the length of the movable conveyor section 16. The plurality of teeth 50 may include a pair of arrays 54, 56 of teeth with each array being positioned on or along one of the lower members 34, 36 of the lower extent 32 of the movable conveyor section 16. Each array 54, 56 of teeth may extend along axes that are oriented substantially parallel to a longitudinal axis of the movable conveyor section 16, and the axes of the arrays 54, 56 may be oriented substantially parallel to each other. The teeth 54 of each array 54, 56 may extend in a substantially downward direction from the movable conveyor section 16. The arrays 54, 56 may be mounted on the lower extent 32 of the movable conveyor section 16, and each array may be mounted on one of the lower members 34, 36 of the lower extent. Each array 54, 56 of teeth may be positioned adjacent to, and may be directly mounted on, the lower surface 38 of a respective one of the lower members 34, 36 of the movable conveyor section 16. The teeth 52 of each array may be spaced from each other in the longitudinal direction of the movable conveyor section 16. The teeth 52 may be suitably shaped and spaced to engage the links (or spaces between links) of a chain, which will be described in greater detail below. In some embodiments, the arrays 54, 56 of teeth may extend along at least approximately 50% of the length of the movable conveyor section 16. In some more preferred embodiments, the arrays 54, 56 of teeth may extend along at least approximately 75% of the length of the movable conveyor section 16.

The movement assembly 50 may further include a teeth engaging apparatus 60 for engaging and moving the plurality of teeth 52 on the movable conveyor section 16 with respect to the stationary conveyor section 14. The teeth engaging apparatus 60 may be mounted on the stationary conveyor section 14, and may be positioned toward the outboard end 20 of the stationary conveyor section. The teeth engaging apparatus 60, 62 may comprise a pair of teeth engaging apparatus 60, 62 that are laterally spaced from each other such that each of the teeth engaging apparatus 60, 62 is generally aligned with one of the arrays 54 of teeth 52.

Each of the chain engaging apparatus 60, 62 may comprise a chain loop 64, 66 so that the movement assembly 50 includes a pair of laterally spaced chain loops. Each chain loop 64, 66 may include one or more chains of chain links. As shown in the illustrative embodiment, three chains of chain links form each chain loop 64, 66, although more or fewer chains may be employed for each chain loop. The additional (more than one) chains of chain links) may be employed, for example, to strengthen the respective chain loop 64, 66, and to engage multiple arrays 54 of teeth 52 positioned on each lateral side of the lower extent 32 of the movable conveyor section 16. Each chain loop 64, 66 may comprise an upper stretch 68 or section of the chain loop and a lower stretch 70 or portion of the chain loop. The upper stretch 68 of the chain loop may be engaged with a portion of the or each array 54 of teeth 52 on the movable conveyor section 16 such that movement of the upper stretch 68 of the chain loop causes movement of the array 54 of teeth and the movable conveyor section 16 on which the array of teeth is mounted. As is evident to one of ordinary skill in the art, the upper 68 and lower 70 stretches are not comprised of a set or discrete group of chain links, and chain links move between the upper and lower stretches as the loop rotates on the sprockets on which the chain loop is entrained, as will now be described.

Each of the teeth engaging apparatus 60 may further include a pair of sprockets 72, 74 which have one of the chain loops 64, 66 entrained thereon. The pair of sprockets 72, 74 may be rotatably mounted on the stationary conveyor section 14, and may be spaced from each other along an axis oriented substantially parallel to the longitudinal axis or direction of the stationary conveyor section. Each of the sprockets 72, 74 of one of the teeth engaging apparatus 60, 62 may be mounted on a respective one of the first 42 and second 44 support axles. The chain loops 64, 66 may thus encircle the support axles 44, 46. In various embodiments, each of the sprockets 72, 74 is mounted substantially concentrically with one of the support rollers 50. In embodiments such that the one that is illustrated, each of the sprockets 72, 74 may comprise a pair of sprocket members, and each sprocket member engages a separate one of the chain of chain links. Illustratively, a chain loop 64, 66 may comprise three chains of chain links, and the outer two chains of chain links are engaged by the pair of sprocket members, while a third (optionally central) chain of chain links may engage the teeth 52 of the array of teeth.

The movement assembly 50 may further include a drive system 80 (see FIGS. 5 and 8) that is configured to rotate at least one of the sprockets 72, 74 to thereby rotate the chain loop or loops 64, 66. Illustratively, the drive system 80 may comprise a motor 82 linked to one of the support axles 42, 44, and may directly act on the axle or the motor 82 may be linked, for example, through a series of gears or chains to the axle.

It is noted that although the illustrative embodiment includes downwardly extending teeth, such an orientation is not critical to the operation of the invention, and it is possible that the teeth may extend in other orientations, such as, for example, laterally outwardly or inwardly from the lower extent 32 of the movable conveyor section 16. The downward orientation of the teeth 52 does take advantage of the weight of the movable conveyor section 16 to press the teeth into engagement with the chain loops 64, 66 in a manner that is not present when the teeth are otherwise oriented.

It will also be recognized that while the illustrative embodiment has a movement assembly 50 mounted on the stationary conveyor section 14 and the arrays 54, 56 of teeth mounted on the movable conveyor section 16, the plurality of teeth could be mounted on the stationary conveyor section 14 and the movement assembly could be mounted on the movable conveyor section.

Other variations of the system 10 may be employed on conveyor systems in which multiple conveyor sections are movable with respect to a stationary conveyor section, such as when two conveyor sections are movable from one end of the stationary conveyor section, and when a movable conveyor section is movable from each end of the stationary conveyor section.

With respect to the above description then, it is to be realized that the optimum dimensional relationships for the parts of the invention, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:
1. An extendable conveyor apparatus comprising:
   a stationary conveyor section having a first conveyor belt;
   a movable conveyor section extendable with respect to the stationary conveyor section, the movable conveyor section having a second conveyor belt distinct from the first conveyor belt; and
   a movement assembly configured to move the movable conveyor section with respect to the stationary conveyor section, the movement assembly comprising:
      a plurality of teeth mounted on a first one of the conveyor sections; and
      a teeth engaging apparatus mounted on a second one of the conveyor sections and configured to engage and move the plurality of teeth on the first conveyor section with respect to the second conveyor section.

2. The extendable conveyor apparatus of claim 1 wherein the teeth engaging apparatus is mounted on the stationary conveyor section, and the teeth are mounted on the movable conveyor section.

3. The extendable conveyor apparatus of claim 1 wherein the plurality of teeth comprises a pair of arrays of teeth, and the teeth engaging apparatus comprises a pair of teeth engaging apparatus, each teeth engaging apparatus engaging a portion of one of the arrays of teeth.

4. The extendable conveyor apparatus of claim 1 wherein the teeth engaging apparatus comprises a chain loop engaging a portion of the plurality of teeth.

5. The extendable conveyor apparatus of claim 4 wherein the chain loop includes an upper stretch of chain and a lower stretch of chain, the upper stretch of chain being engaged with the portion of the plurality of teeth such that rotation of the chain loop produces movement of the portion of the plurality of teeth with respect to the chain loop.

6. The extendable conveyor apparatus of claim 4 wherein the teeth engaging apparatus comprises a pair of sprockets having the chain loop entrained thereon.

7. The extendable conveyor apparatus of claim 6 wherein the pair of sprockets are rotatably mounted on the stationary conveyor section, the pair of sprockets being spaced from each other along an axis oriented substantially parallel to a longitudinal axis of the stationary conveyor section.

8. The extendable conveyor apparatus of claim 7 further comprising a support roller mounted substantially concentrically with one of the sprockets of the pair of sprockets, the movable conveyor section resting on the support roller.

9. The extendable conveyor apparatus of claim 7 further comprising drive system configured to rotate at least one of the sprockets of the pair of sprockets.

10. The extendable conveyor apparatus of claim 1 wherein the plurality of teeth comprises a pair of arrays of teeth, and the teeth engaging apparatus comprises a pair of teeth engaging apparatus, each teeth engaging apparatus engaging a portion of one of the arrays of teeth;
    wherein each of the teeth engaging apparatus comprises a chain loop engaging a portion of one of the arrays of teeth;
    wherein each of the chain loops includes an upper stretch of chain and a lower stretch of chain, the upper stretch of chain being engaged with the portion of the array of teeth such that rotation of the chain loop produces movement of the portion of the array of teeth with respect to the chain loop; and
    wherein the teeth engaging apparatus comprises a pair of sprockets having the chain loop entrained thereon.

11. The extendable conveyor apparatus of claim 1 wherein the teeth engaging apparatus is mounted on the stationary conveyor section, and the teeth are mounted on the movable conveyor section;
    wherein the plurality of teeth comprises a pair of arrays of teeth, and the teeth engaging apparatus comprises a pair of teeth engaging apparatus, each teeth engaging apparatus engaging a portion of one of the arrays of teeth;
    wherein each of the teeth engaging apparatus comprises a chain loop engaging a portion of one of the arrays of teeth;
    wherein each of the chain loops includes an upper stretch of chain and a lower stretch of chain, the upper stretch of chain being engaged with the portion of the array of teeth such that rotation of the chain loop produces movement of the portion of the array of teeth with respect to the chain loop;
    wherein the teeth engaging apparatus comprises a pair of sprockets having the chain loop entrained thereon;
    wherein a support roller is mounted substantially concentrically with one of the sprockets of the pair of sprockets, the movable conveyor section resting on the support roller; and
    wherein a drive system is configured to rotate at least one of the sprockets of the pair of sprockets.

12. A system for moving a first elongate structure with respect to a second elongate structure, comprising:
    a plurality of teeth positioned in a substantially linear arrangement and configured for mounting on the first elongate structure; and
    a teeth engaging apparatus configured for mounting on the second elongate structure, the teeth engaging structure comprising a loop having a stretch engaging a portion of the plurality of teeth such that rotation of the loop causes movement of the first elongate structure with respect to the second elongate structure.

13. The system of claim 12 wherein the plurality of teeth comprises a pair of arrays of teeth, each of the arrays of teeth being positioned in a substantially linear arrangement, and the teeth engaging apparatus comprises a pair of the loops with each of the loops engaging a portion of one of the arrays of teeth.

14. The system of claim 12 wherein the teeth engaging apparatus further comprises a pair of sprockets having the loop entrained thereon.

15. The system of claim 14 further comprising a drive system configured to rotate at least one of the sprockets of the pair of sprockets.

16. An extendable conveyor apparatus comprising:
    a stationary conveyor section having a first conveyor belt;
    a movable conveyor section extendable with respect to the stationary conveyor section, the movable conveyor section having a second conveyor belt distinct from the first conveyor belt; and
    a movement assembly to move the movable conveyor section with respect to the stationary conveyor section, the movement assembly comprising:
        a plurality of teeth mounted on a first one of the conveyor sections; and
        a teeth engaging apparatus mounted on a second one of the conveyor sections and engaging the plurality of teeth on the first conveyor section to move the first conveyor section with respect to the second conveyor section.

17. The extendable conveyor apparatus of claim 16 wherein the teeth engaging apparatus is mounted on the stationary conveyor section, and the teeth are mounted on the movable conveyor section.

18. The extendable conveyor apparatus of claim 1 wherein the plurality of teeth comprises a pair of arrays of teeth, and the teeth engaging apparatus comprises a pair of teeth engaging apparatus, each teeth engaging apparatus engaging a portion of one of the arrays of teeth.

19. The extendable conveyor apparatus of claim 1 wherein the teeth engaging apparatus comprises a loop engaging a portion of the plurality of teeth.

* * * * *